United States Patent
Witte et al.

(10) Patent No.: US 11,993,352 B1
(45) Date of Patent: May 28, 2024

(54) SEATING SYSTEM AND SEAT ASSEMBLY FOR MARINE VESSEL

(71) Applicant: Brunswick Corporation, Mettawa, IL (US)

(72) Inventors: John Witte, Ada, MI (US); Michael J. Boks, Grand Rapids, MI (US); Eric S. Deuel, Allendale, MI (US)

(73) Assignee: Brunswick Corporation, Mettawa, IL (US)

( * ) Notice: Subject to any disclaimer, the term of this patent is extended or adjusted under 35 U.S.C. 154(b) by 517 days.

(21) Appl. No.: 17/227,963

(22) Filed: Apr. 12, 2021

(51) Int. Cl.
| | |
|---|---|
| *B63B 79/40* | (2020.01) |
| *B60N 2/00* | (2006.01) |
| *B60N 2/02* | (2006.01) |
| *B60N 2/52* | (2006.01) |
| *B63B 3/48* | (2006.01) |
| *B63B 29/04* | (2006.01) |
| *B63B 79/10* | (2020.01) |

(52) U.S. Cl.
CPC .............. *B63B 79/40* (2020.01); *B60N 2/002* (2013.01); *B60N 2/0268* (2023.08); *B60N 2/522* (2013.01); *B63B 3/48* (2013.01); *B63B 29/04* (2013.01); *B63B 79/10* (2020.01); *B63B 2029/043* (2013.01)

(58) Field of Classification Search
CPC ........... B63B 79/40; B63B 3/48; B63B 29/04; B63B 79/10; B63B 2029/043; B63B 29/12; B60N 2/002; B60N 2/0268; B60N 2/522; B60R 11/04
See application file for complete search history.

(56) References Cited

U.S. PATENT DOCUMENTS

| | | | |
|---|---|---|---|
| 2,749,969 | A | 6/1956 | Tatter |
| 3,839,757 | A | 10/1974 | Grimes |
| 5,383,640 | A | 1/1995 | Johnson et al. |
| 5,636,884 | A | 6/1997 | Ladetto et al. |
| 5,975,508 | A | 11/1999 | Beard |
| 6,138,973 | A | 10/2000 | Woodward |
| 6,450,845 | B1 | 9/2002 | Snyder et al. |
| 6,940,026 | B2 | 9/2005 | Rundell et al. |
| 7,017,872 | B2 | 3/2006 | Hogle et al. |
| 7,303,236 | B2 | 12/2007 | Ritter et al. |
| 7,355,518 | B1 | 4/2008 | Staerzl |
| 7,364,234 | B2 | 4/2008 | Begin et al. |

(Continued)

FOREIGN PATENT DOCUMENTS

CN 201525307 U 7/2010

*Primary Examiner* — Adam R Mott
*Assistant Examiner* — Erick T. Detweiler
(74) *Attorney, Agent, or Firm* — Andrus Intellectual Property Law, LLP

(57) ABSTRACT

A seat assembly for a marine vessel includes a base to be connected to a deck of the marine vessel, a seat supported by the base, and an actuator. The actuator adjusts a position of the seat with respect to the base in at least one of the following ways: to translate the seat in a front-back direction with respect to the base, to raise and lower the seat with respect to the base, to tilt the seat at various angles with respect to the base, and to rotate the seat with respect to the base. The seat assembly also includes a controller in signal communication with the actuator, and the controller activates the actuator to adjust the position of the seat with respect to the base to a predetermined position.

18 Claims, 8 Drawing Sheets

(56) References Cited

U.S. PATENT DOCUMENTS

| | | | |
|---|---|---|---|
| 7,490,572 B2 * | 2/2009 | Grober | B60R 11/04 |
| | | | 114/191 |
| 7,490,905 B2 | 2/2009 | Ritter et al. | |
| 7,686,397 B2 | 3/2010 | Sahi | |
| 7,866,751 B2 | 1/2011 | Downey | |
| 7,938,377 B2 | 5/2011 | Draghici et al. | |
| 7,950,618 B1 | 5/2011 | Burer | |
| 8,292,368 B1 | 10/2012 | Yarbrough | |
| 8,444,203 B2 | 5/2013 | Ohtsubo | |
| 8,474,910 B2 | 7/2013 | Kammerer | |
| 8,540,316 B2 | 9/2013 | Deml et al. | |
| 8,590,971 B2 | 11/2013 | Ito et al. | |
| 8,864,232 B2 | 10/2014 | Hashimoto | |
| 9,120,410 B2 | 9/2015 | Bauman | |
| 9,242,703 B2 | 1/2016 | Nutz et al. | |
| 9,399,415 B2 | 7/2016 | Serber | |
| 9,481,466 B2 | 11/2016 | Fischer et al. | |
| 9,528,567 B2 | 12/2016 | Robbins et al. | |
| 9,604,550 B2 | 3/2017 | Ito | |
| 9,604,707 B2 | 3/2017 | Falck et al. | |
| 9,630,527 B2 | 4/2017 | Matsui | |
| 9,655,458 B2 | 5/2017 | Jacobs et al. | |
| 9,925,892 B2 | 3/2018 | Frye et al. | |
| 10,005,380 B2 | 6/2018 | Reid et al. | |
| 10,086,728 B2 | 10/2018 | White et al. | |
| 10,328,826 B2 | 6/2019 | Ramachandra et al. | |
| 10,377,281 B2 | 8/2019 | Pleskot | |
| 10,532,673 B2 | 1/2020 | Kemp et al. | |
| 10,752,139 B2 | 8/2020 | Plante et al. | |
| 10,773,613 B2 | 9/2020 | Nakamura et al. | |
| 2017/0080831 A1 | 3/2017 | Kaemmerer et al. | |

\* cited by examiner

SEATING SYSTEM AND SEAT ASSEMBLY FOR MARINE VESSEL

FIELD

The present disclosure relates to seating systems and seat assemblies for marine vessels, and more particularly to a seat assembly the position of which is adjustable with respect to the deck of the marine vessel.

BACKGROUND

U.S. Pat. No. 6,138,973 discloses a seat pedestal comprised of a first tubular vertical support member attached to an underlying deck by a base member, a second tubular member telescoped within the first member, means for attaching a seat to the top of the second member, and means for adjusting the height of the second member within the first comprising a vertical slot in the second member and a plurality of vertically spaced horizontal radial slots intersecting and extending from the vertical slot and a stationary pin extending from the first member through the slot and about which the second member may be changed in height by positioning the pin selectively within one of the horizontal slots.

U.S. Pat. No. 6,450,845 discloses a tetherless occupant detector system that uses an infrared sensor and a monitor circuit that provides a deactivation signal to an engine control unit or other control mechanisms in the event of an operator of the marine vessel leaving a preselected control position at its helm. The infrared sensor provides an output signal that is generally representative of the heat produced by an occupant within the control position of a marine vessel. The monitor circuit reacts to a sudden decrease in this heat magnitude and provides a deactivation signal in response to detecting this sudden decrease. The deactivation signal provided by the monitor circuit can be received by an engine control unit which then, in turn, deactivates a marine propulsion system. Alternatively, the deactivation signal itself can cause a deactivation of the marine propulsion system.

U.S. Pat. No. 7,017,872 discloses a pedestal assembly for supporting a seat including a first cylinder having an inner surface with a plurality of longitudinally-extending channels, and a second cylinder having an inner surface with a plurality of longitudinally-extending channels and an outer surface with a plurality of longitudinally-extending grooves. The assembly also includes a first bushing that is operably coupled to one end of the second cylinder by a plurality of fasteners received within an end of the channels of the second cylinder, and a second bushing that is operably coupled to one end of the first cylinder by a plurality of fasteners received within an end of the channels of the first cylinder. The second bushing includes a plurality of tabs slidably received within the channels on the inner surface of the first cylinder and is adapted to telescopingly guide the second cylinder within the first cylinder.

U.S. Pat. Nos. 7,303,236 and 7,490,905 disclose apparatuses for operation of a vehicle seat slider. A disclosed apparatus includes a cable assembly having a first end and a second end. The first end of the cable assembly is configured to be operatively coupled to a slider mechanism of a vehicle seat. A release member is operatively coupled to the second end of the cable assembly so that the slider mechanism is urged toward a locked condition in the absence of a force being applied to the release member by a person.

U.S. Pat. No. 7,355,518 discloses a monitoring system that detects the presence or absence of a marine vessel operator within a defined zone near the helm of a marine vessel. The detection is accomplished through the use of a provision of an e-field and the detection of e-field strength by a receiving antenna system. When the operator is in the proper helm position, the e-field strength is diminished by the presence of a portion of the operator's body within the e-field zone.

U.S. Pat. No. 7,364,234 discloses a swivel mechanism for a vehicle seat including a base plate configured to be fixed relative to the vehicle and to provide support to the vehicle seat. The vehicle seat is mounted to a seat mounting plate having a first side configured to receive the vehicle seat and a second side opposite the first side, mechanically coupled to the base plate. The seat mounting plate and the base plate are mechanically coupled so that when the seat mounting plate is rotated about an axis of the base plate the seat mounting plate translates in a plane that is substantially perpendicular to the axis of the base plate. A locking recess is formed in one of the base plate or the seat mounting plate, and is adapted to receive a locking pawl pivotably mounted to the opposite one of the base plate or the seat mounting plate. The locking recess is biased toward the locking recess such that when the locking pawl and locking recess are engaged, the seat mounting plate is inhibited from movement relative to the base plate.

U.S. Pat. No. 7,866,751 discloses an apparatus and methods to integrally form lever operated cables with vehicle seats. An example apparatus includes a channel integrally formed in a portion of a vehicle seat and a seat position control integrally coupled to the vehicle seat. A cable assembly slidably movable within the channel and has a first end operatively coupled to a seat position adjustment mechanism and a second end operatively coupled to the seat position control.

U.S. Pat. No. 7,938,377 discloses a seat slider. The slider seat includes a seat mount and a first slider guide extending along at least a portion of the perimeter of the seat mount. A second slider guide extends from the surface of the seat mount at a position distally located from the perimeter of the seat mount. A slider plate to which a vehicle seat can be mounted includes a first channel for slidably engaging the first slider guide and a second channel for slidably engaging the second slider guide such that the slider plate is slidable between a first position and a second position relative to the seat mount. A locking lever is movably coupled to the slider plate and includes a locking structure to prevent the slider plate from moving relative to the seat mount. A control member operatively coupled to the locking lever to cause the locking lever to move toward an unlocked position wherein the locking structure allows the slider plate to move relative to the seat mount. In some examples, a trim piece is adapted to at least partially cover fasteners mounting the assembly to a vehicle support surface.

The above-noted patents are hereby incorporated by reference herein in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a seating system for a marine vessel includes a seat assembly including a base configured to be connected to a deck of the marine vessel, a seat configured to be supported by the base, and an actuator configured to adjust a position of the seat with respect to the base. The seating system also includes a controller configured to control the actuator. The controller is configured to activate the actuator to adjust the position of the seat with respect to the base to a predetermined position dependent on the following: a presence of an operator on the marine vessel, a state of a power unit of a marine propulsion device on the marine vessel, a speed of the marine vessel, a geographical location of the marine vessel, and a pitch of the marine vessel.

According to another example, a seat assembly for a marine vessel includes a base configured to be connected to a deck of the marine vessel, a seat configured to be supported by the base, and an actuator. The actuator is configured to adjust a position of the seat with respect to the base in at least one of the following ways: to translate the seat in a front-back direction with respect to the base, to raise and lower the seat with respect to the base, to tilt the seat at various angles with respect to the base, and to rotate the seat with respect to the base. The seat assembly also includes a controller in signal communication with the actuator, and the controller is configured to activate the actuator to adjust the position of the seat with respect to the base to a predetermined position.

BRIEF DESCRIPTION OF DRAWINGS

Examples of seating systems and subassemblies thereof are described with reference to the following Figures. The same numbers are used throughout the Figures to reference like features and like components.

DETAILED DESCRIPTION

Figure 1:
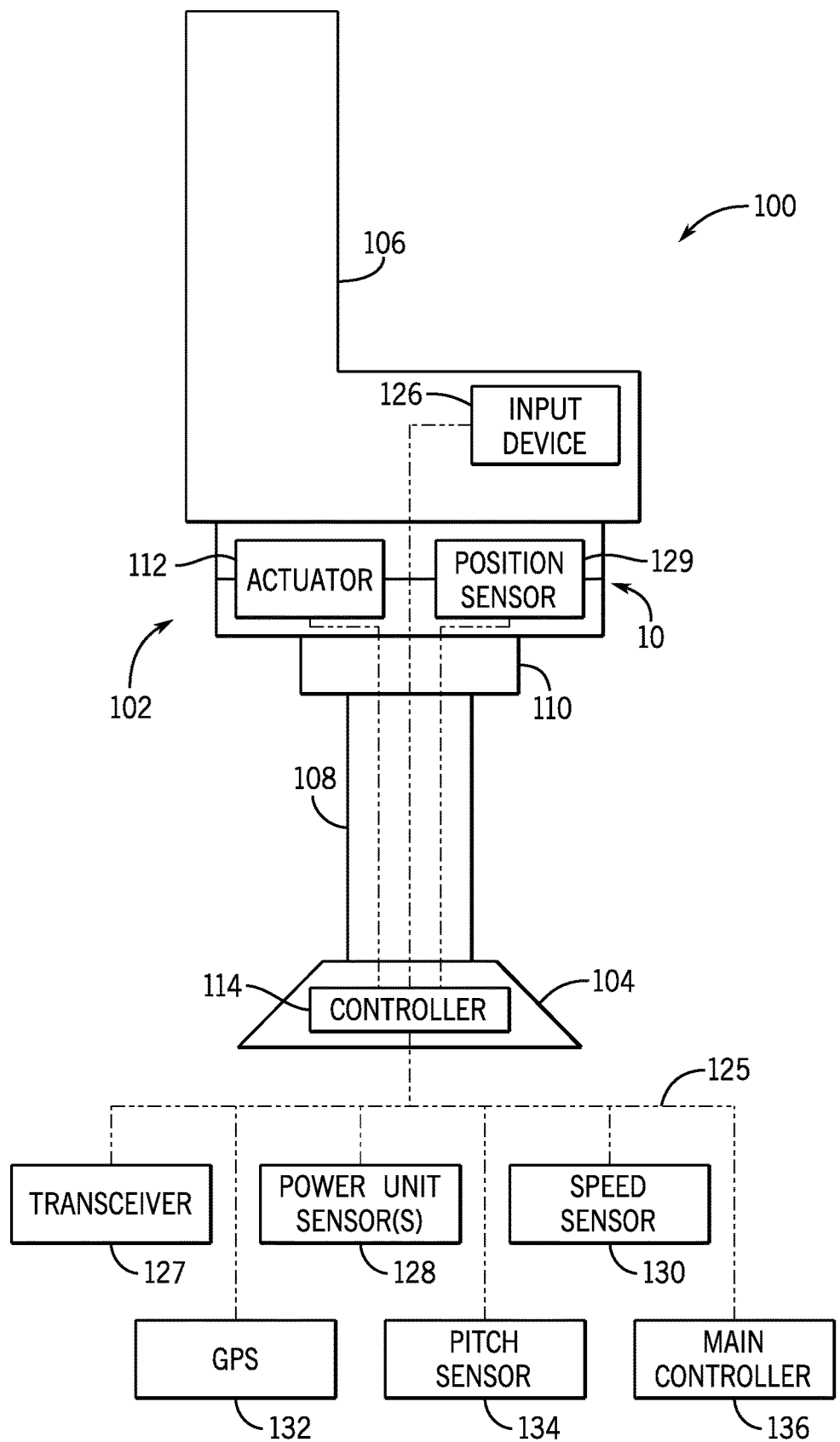
FIG. 1 illustrates one example of a seating system for a marine vessel.

FIG. 1 illustrates a seating system 100 for a marine vessel (not shown). The seating system 100 includes a seat assembly 102 including a base 104 configured to be connected to a deck (not shown) of the marine vessel, such as by way of bolting, as is known. The seat assembly 102 also includes a seat 106 configured to be supported by the base 104, such as by way of a pedestal 108 extending vertically between the two. Note that although a columnar pedestal 108 and semi-conical base 104 are shown herein, the pedestal 108 and base 104 could have any appropriate shapes or configurations. Alternatively, the seat 106 could be supported by a frame-like or a box-like structure. A seat support assembly 10, which will be described further herein below, and a swivel assembly 110 are attached between the bottom of the seat 106 and the top of the pedestal 108. Although not shown here, a mounting assembly (such as a horizontally oriented plate supported by a vertically oriented stem configured to be connected to the pedestal 108) can be provided between the top of the pedestal 108 and the swivel assembly 110. In another example, the swivel assembly is provided within the pedestal 108. Different types of bases, pedestals, swivel assemblies, and mounting assemblies are well known in the art and will not be described further herein.

The seat assembly 102 also includes an actuator 112 configured to adjust a position of the seat 106 with respect to the base 104. More specifically, the actuator 112 is configured to move parts of the seat support assembly 10 to translate the seat 106 in a front-back direction with respect to the base 104, to raise and lower the seat 106 with respect to the base 104, and to tilt the seat 106 at various angles with respect to the base 104. The actuator 112 is also configured to move parts of the swivel assembly 110 to rotate the seat 106 with respect to the base 104. Although an actuator is not shown specifically within the swivel assembly 110, those having ordinary skill in the art would understand that, for example, a rotary actuator could be used for this purpose. Note that separate actuators could be provided for each of the front-back movement, raise/lower movement, tilt movement, and swiveling movement, although only one actuator 112 is shown in this view for purposes of simplicity. For example, multiple actuators that are part of the seat support assembly 10 will be described further herein with respect to FIGS. 3 and 4.

The seating system 100 also includes a controller 114 in signal communication with the actuator 112 and configured to control the actuator 112. As will be described further herein below, the controller 114 is configured to activate the actuator 112 to adjust the position of the seat 106 with respect to the base 104 to a predetermined position dependent on the following: a presence of an operator on the marine vessel, a state of a power unit of a marine propulsion device on the marine vessel, a speed of the marine vessel, a geographical location of the marine vessel, and/or a pitch of the marine vessel. The controller 114 can use other information to control the actuator 112, as will also be discussed herein below.

Figure 2:
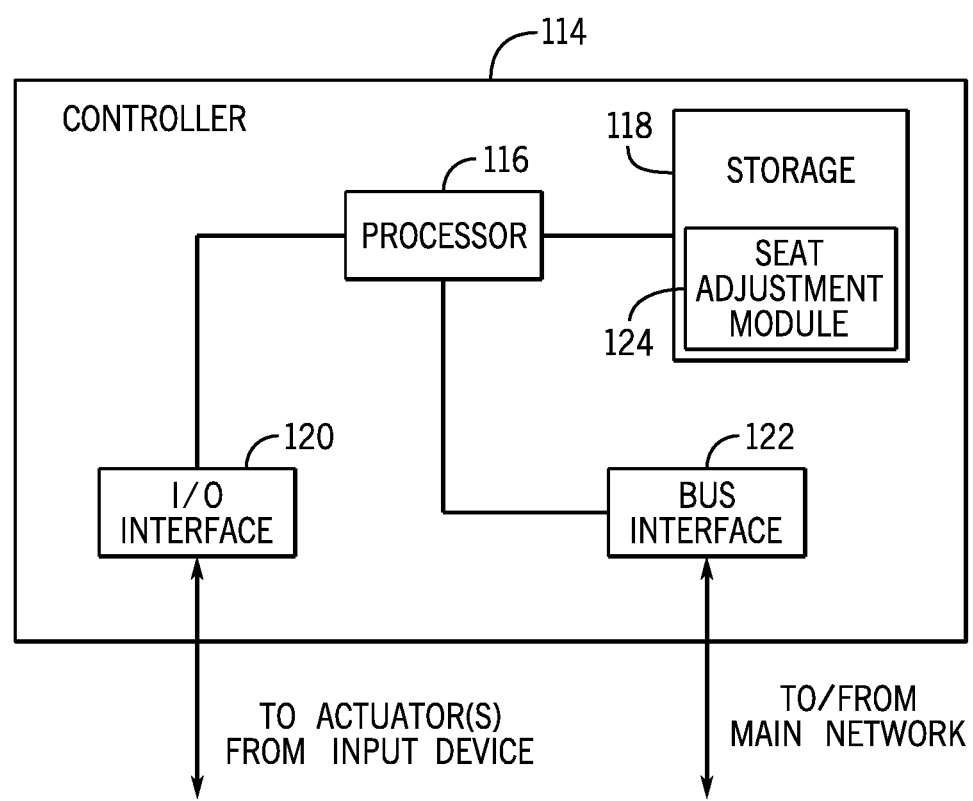
FIG. 2 illustrates the schematics of a controller for the seating system.

FIG. 2 shows a schematic of one example of the controller 114. The controller 114 includes a processing system 116 and a storage system 118. The processing systems 116 includes one or more processors, which may each be a microprocessor, a general-purpose central processing unit, an application-specific processor, a microcontroller, or any other type of logic-based device. The processing system 116 may also include circuitry that retrieves and executes software from the storage system 118. The processing system 116 may be implemented with a single processing device but may also be distributed across multiple processing devices or subsystems that cooperate in executing program instructions. The storage system 118 can comprise any storage media, or group of storage media, readable by the processing system 116, and capable of storing software. The storage system 118 may include volatile and non-volatile, removable and non-removable media implemented in any method or technology for storing information, such as computer-readable instructions, program modules comprising such instructions, data structures, etc. The storage system 118 may be implemented as a single storage device but may also be implemented across multiple storage devices or subsystems. Examples of storage media include random access memory, read only memory, optical discs, flash memory, virtual memory, and non-virtual memory, or any other medium which can be used to store the desired information and that may be accessed by an instruction execution system, as well as any combination of variation thereof. The storage media may be housed locally with the processing system 116, or may be distributed, such as distributed on one or more network servers, such as in cloud computing applications and systems. In some implementations, the storage media is non-transitory storage media. In some implementations, at least a portion of the storage media may be transitory.

The controller 114 also includes an input/output interface 120 that transfers information and commands to and from the processing system 116. The I/O interface 120 receives commands from an input device 126, as will be described with respect to FIG. 1, and relays them to the processing system 116. In response to the commands from the input device 126 and/or in response to the processing system 116 carrying out instructions stored in a seat adjustment module 124, the processing system 116 relays commands via the I/O interface 120 to the actuator 112 controlling the position of the seat 106 with respect to the base 104. Other devices may also be connected to the I/O interface 120, and the examples shown and discussed herein are not limiting. The controller 114 also includes a bus interface 122, by way of which the controller 114 is in signal communication with a main network of the marine vessel, by way of which the controller 114 may be provided with information related to the presence of the operator, the state of the power unit, the speed of the marine vessel, the geographical location of the marine vessel, and the pitch of the marine vessel.

The seat adjustment module 124 is a set of software instructions executable to adjust the position of the seat 106 with respect to the base 104. The seat adjustment module 124 may be a set of software instructions stored within the storage system 118 and executable by the processing system 116 to operate as described herein, such as to adjust the position of the seat 106 with respect to the base 104 to one or more predetermined positions dependent on the following: the presence of an operator on the marine vessel, the state of the power unit of a marine propulsion device on the marine vessel, the speed of the marine vessel, the geographical location of the marine vessel, and/or the pitch of the marine vessel. One of the above-noted types of information can be taken into account, or two or more in combination can be used. Returning to FIG. 1, the above-noted information upon which the one or more predetermined positions of the seat 106 with respect to the base 104 are dependent upon can be determined from various sensors and devices on the vessel, which may be directly connected (hardwired) to the controller 114 via the I/O interface 120 or which may be in communication with the controller 114 via the main network bus 125 (e.g., controller area network bus) and the bus interface 122. In another example, the controller 114 includes a wireless transceiver capable of two-way wireless communication, and the sensors and devices communicate wirelessly with the controller 114. Exemplary wireless protocols that could be used for this purpose include, but are not limited to, Bluetooth®, Bluetooth Low Energy (BLE), ANT, and ZigBee.

The presence of the operator on the marine vessel can be determined in many different ways. For example, the operator's presence can be sensed by a transceiver 127 configured to communicate with a wireless transceiver or transmitter carried by the operator in a device such as a key or a fob, or worn around the operator's neck or wrist. The transceiver 126 can communicate the nearby presence of the operator's transceiver or transmitter (e.g., within 10 feet) to the controller 114 via the main network bus 125, in response to which the controller 114 determines that the operator is aboard the vessel. In some examples, the operator's transceiver or transmitter is operator-specific, such that the controller 114 knows which operator is on board the vessel and can adjust the position of the seat 106 accordingly. In other examples, a weight or pressure sensor may be present immediately in front of the seat assembly 102, which may communicate the presence of the operator in the helm area to the controller 114. In yet another example, the operator may use a remote-control device or a smart phone or tablet to provide input to the controller 114 regarding the operator's presence on board.

The state of the power unit of the marine propulsion device on the marine vessel may be determined by one or more power unit sensors 128, which may be located at the vessel's helm and/or on the power unit (e.g., trolling motor, outboard engine, stern drive, inboard, pod drive, etc.). For example, the power unit sensors 128 may be sensors at the helm that indicate whether a key has been turned in the ignition, whether a joystick has been manipulated, whether a throttle lever has been manipulated (and to what position), and/or whether an engine or motor start/stop button has been pressed. The power unit sensors 128 may alternatively or additionally comprise sensors indicating a speed of the engine or motor of the power unit, a gear or direction of rotation of a propulsion unit of the power unit, a throttle position of a throttle on an engine of the power unit, and/or a current supplied to a motor of the power unit.

The speed of the marine vessel can be determined from the speed sensor 130 connected to the main network bus 125. The speed sensor 130 can be any known type of marine vessel speed sensor, such as a pitot tube or a paddle wheel sensor. In another example, vessel speed is determined by a global positioning system (GPS) 132, which is capable of determining speed over ground based on change in GPS position over time. The GPS 132 also determines the geographical location of the marine vessel.

The pitch of the marine vessel is its angle about an axis extending laterally across the marine vessel. The vessel's pitch is determined by a pitch sensor 134, which can be, for example, a gyroscope or an inclinometer. In some examples, the GPS 132 and pitch sensor 134 are both part of a single device such as a motion reference unit (MRU) or an attitude and heading reference system (AHRS).

The main network bus 125 is also connected to a main controller 136, such as a helm controller, which may accept commands from various input devices, such as buttons or switches for adjusting the position of the seat 106, as well as from a joystick, throttle lever, steering wheel, etc., as is known. The controller 114 discussed herein below as controlling the position of the seat 106 is shown as being located on or in the seat assembly 102 (here, in the base 104) and is connected to the main network of the marine vessel. In other examples, the controller 114 could be located on or in the pedestal 108, the seat support assembly 10, or the seat 106. It is also contemplated that the controller 114 could be located under the deck of the marine vessel, or that the main controller 136 or another controller on the vessel could perform all or some of the seat adjustment algorithms disclosed herein.

As noted herein above, the actuator 112 can include separate actuators for each of the forward-back, raise/lower, tilt, and rotate adjustments to the seat 106. One example of a seat support assembly 10 having a geometry and actuators for accomplishing the forward-back, raise/lower, and tilt adjustments will now be described.

Figure 3:
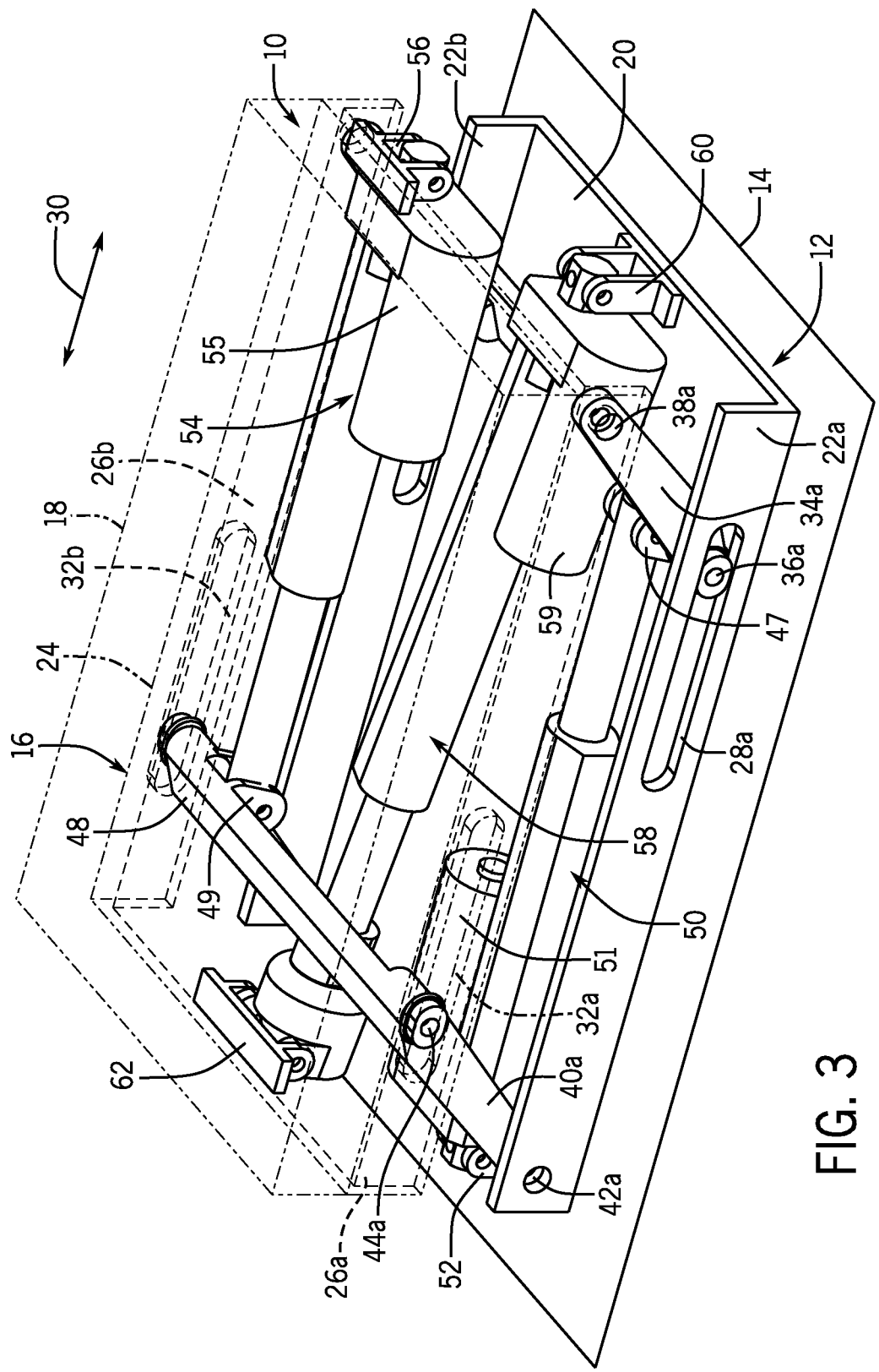
FIG. 3 illustrates a first side perspective view of a seat support assembly according to the present disclosure.
Figure 4:
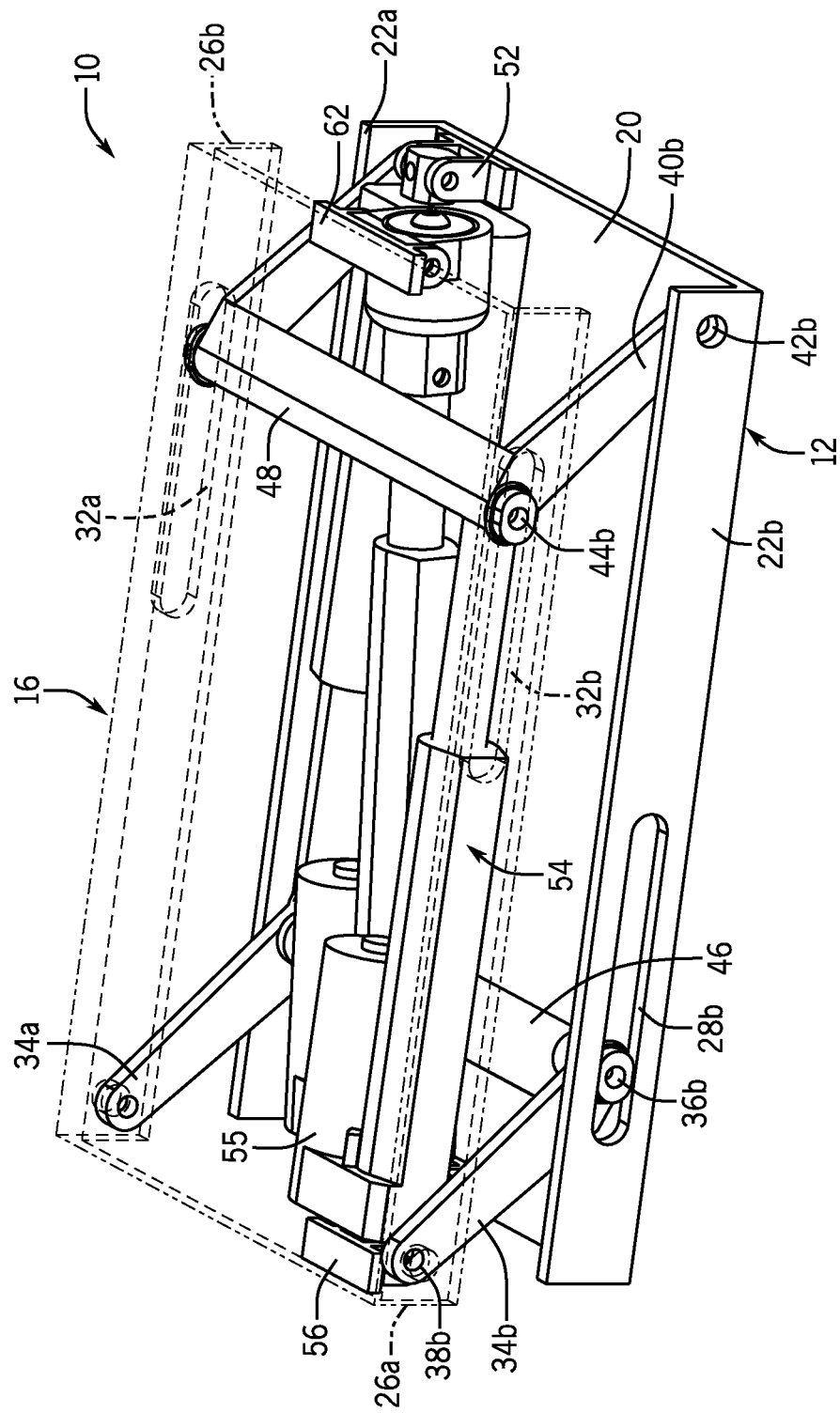
FIG. 4 illustrates an opposite side perspective view of the seat support assembly.

FIGS. 3 and 4 illustrate opposite side perspective views of a seat support assembly 10 for supporting the seat 106. The seat support assembly 10 includes a lower member 12 configured to be coupled to the marine vessel's deck, such as by way of the swivel assembly 110, the pedestal 108, and the base 104 there beneath. The seat support assembly 10 also includes an upper member 16 positioned above the lower member 12 and configured to have a seat pan 18 of the seat 106 coupled thereto. The lower member 12 remains stationary with respect to the deck while the seat 106 moves forward or backward, up or down, or tilts with the upper member 16, as will be described below. The lower and upper members 12, 16 can both rotate with respect to the deck by way of the swivel assembly 110, which was described herein above.

The lower member 12 is shown as a rectangular plate 20 with upwardly extending sidewalls 22a, 22b on either lateral side thereof. Likewise, the upper member 16 is shown as a rectangular plate 24 with downwardly extending sidewalls 26a, 26b on either lateral side thereof. In other examples, the lower and upper members 12, 16 are not formed of rectangular plates 20, 24, respectively, but instead one or both of the lower and upper members 12, 16 can be an open frame or a single beam-like member. Although the lower and upper members 12, 16 are shown with opposing sidewalls 22a, 22b and 26a, 26b, respectively, in other examples, no sidewalls are provided and the lower and upper members 12, 16 comprise the plates 20, 24 only. In other examples, the sidewalls are present, but they are not at located the lateral edges of the plates 20, 24; instead, the sidewalls are spaced inwardly from the lateral edges of the plates 20, 24. In yet another example, the sidewalls extend downwardly from the plate 20 of the lower member 12 and/or upwardly from the plate 24 of the upper member 16. In general, the geometry of the lower and upper members 12, 16 is not important so long as they can accommodate the components required for raising and lowering the upper member 16, moving the upper member 16 in a front-back direction 30, and tilting the upper member 16, all as will be described further herein below.

Still referring to FIGS. 3 and 4, the lower member 12 comprises a first channel 28a extending in the front-back direction 30 of the seat support assembly 10 and a third channel 28b extending in the front-back direction 30 and spaced laterally from the first channel 28a. The upper member 16 comprises a second channel 32a extending in the front-back direction 30 and a fourth channel 32b extending in the front-back direction 30 and spaced laterally from the second channel 32a. Here, the channels 28a, 28b and 32a, 32b are slots formed in the sidewalls 22a, 22b and 26a, 26b, respectively. However, the channels could instead be depressions formed in the sidewalls 22a, 22b and 26a, 26b or slots or depressions formed in the plates 20, 24. In other examples, the channels are formed in brackets attached to the sidewalls 22a, 22b and 26a, 26b and/or plates 20, 24, or are formed by protrusions extending from the sidewalls 22a, 22b and 26a, 26b or plates 20, 24 that form tracks therealong. The channels can be any formation on or in the sidewalls 22a, 22b and 26a, 26b and/or plates 20, 24 that allows for sliding or rolling motion of another component therealong, for purposes described below.

The seat support assembly 10 also includes a first linkage 34a pivotably coupled to the lower and upper members 12, 16 and translatable with respect to at least one of (i.e., one or both of) the lower and upper members 12, 16 in the front-back direction 30 of the seat support assembly 10. More specifically, the first linkage 34a has a lower end pivotably coupled to the lower member 12 and translatable in the front-back direction 30 by way of the first channel 28a, and an upper end pivotably coupled to the upper member 16. The lower end of the first linkage 34a can be coupled to the sidewall 22a by way of a pin 36a or other type of fastener extending through the first channel 28a and into the lower end of the first linkage 34a. The pin 36a is sized and shaped to slide within the first channel 28a, and as the pin 36a does so, the lower end of the first linkage 34a translates along the first channel 28a. The upper end of the first linkage 34a can be coupled to the sidewall 26a of the upper member 16 by way of a pin 38a or other type of fastener. Although this pivot pin 38a is shown as being translationally fixed, and thus the upper end of the first linkage 34a is non-translatably pivotably coupled to the upper member 16, in other examples, a channel could be provided in the sidewall 26a to accommodate the pin 38a in a translatable manner. On the other lateral side of the seat support assembly 10, a third linkage 34b is provided, which has a lower end pivotably coupled to the lower member 12 and translatable in the front-back direction 30 by way of the third channel 28b, and an upper end pivotably coupled to the upper member 16. Such connections can be made to the sidewalls 22b, 26b respectively, by way of pins 36b, 38b, respectively, as described with respect to the first linkage 34a.

A second linkage 40a is also provided, which is pivotably coupled to the lower and upper members 12, 16 and translatable with respect to at least one of (i.e., one or both of) the lower and upper members 12, 16 in the front-back direction 30. More specifically, the second linkage 40a has a lower end pivotably coupled to the lower member 12 and an upper end pivotably coupled to the upper member 16 and translatable in the front-back direction 30 by way of the second channel 32a. On the opposite lateral side, the seat support assembly 10 comprises a fourth linkage 40b having a lower end pivotably coupled to the lower member 12 and an upper end pivotably coupled to the upper member 16 and translatable in the front-back direction 30 by way of the fourth channel 32b. The lower connections are made by way of pins 42a, 42b or other fasteners extending through the sidewalls 22a, 22b, respectively, and through respective lower ends of the second and fourth linkages 40a, 40b. Although these pivot pins 42a, 42b are shown as being translationally fixed, and thus the lower ends of the second and fourth linkages 40a, 40b are non-translatably pivotably coupled to the lower member 12, the pins 42a, 42b could instead be located in channels provided in the sidewalls 22a, 22b. The upper connections are made by way of pins 44a, 44b or other fasteners extending through channels 32a, 32b, respectively, and into respective upper ends of the second and fourth linkages 40a, 40b. The pins 44a, 44b are sized and shaped to slide within the channels 32a, 32b, respectively, such that the upper ends of the second and fourth linkages 40a, 40b can translate in the front-back direction 30 along the channels 32a, 32b.

In other examples, instead of using pins 36a, 36b and 44a, 44b or other fasteners to couple the linkages 34a, 34b and 40a, 40b to the channels 28a, 28b and 32a, 32b, respectively, the appropriate ends of the linkages 34a, 34b and 40a, 40b can be provided with integral protrusions that extend laterally outwardly from the linkages and are configured to be inserted in the channels 28a, 28b and 32a, 32b. Whether pins or integral protrusions are used, the pins or integral protrusions may be coated with or made of material having a low coefficient of friction and high durability. Alternatively, the surfaces of the channels 28a, 28b and 32a, 32b along which the pins or protrusions slide may be coated with a material having a low coefficient of friction and high durability.

Still referring to FIGS. 3 and 4, a lower crosspiece 46 couples the lower ends of the first and third linkages 34a, 34b, and an upper crosspiece 48 couples the upper ends of the second and fourth linkages 40a, 40b. The lower crosspiece 46 allows the lower ends of the first and third linkages 34a, 34b to translate together along the respective first and third channels 28a, 28b. Such movement can be provided, for example, by a lower actuator 50 coupled between the lower member 12 (e.g., at bracket 52) and the lower crosspiece 46 (e.g., at bracket 47). By way of connection to the lower crosspiece 46, the lower actuator 50 is configured to translate the first and third linkages 34a, 34b in the front-back direction 30 along the respective first and third channels 28a, 28b. Similarly, the upper crosspiece 48 allows the upper ends of the second and fourth linkages 40a, 40b to translate together along the respective second and fourth channels 32a, 32b. An upper actuator 54 is coupled between the upper member 16 (e.g., at bracket 56) and the upper crosspiece 48 (e.g., at bracket 49). By way of connection to the upper crosspiece 48, the upper actuator 54 is configured to translate the second and fourth linkages 40a, 40b in the front-back direction 30 along the respective second and fourth channels 32a, 32b. In another example, no lower crosspiece 46 is provided, and the first and third linkages 34a, 34b are controlled by separate actuators to translate together along the respective first and third channels 28a, 28b, such as by synchronizing the activation of the separate actuators. In another example, no upper crosspiece 48 is provided, and the second and fourth linkages 40a, 40b are controlled by separate actuators to translate together along the respective second and fourth channels 32a, 32b, such as by synchronizing the activation of the separate actuators.

A lifting actuator 58 is coupled between the lower member 12 and the upper member 16. The lifting actuator 58 is configured to raise and lower the upper member 16 with respect to the lower member 12. A first end of the lifting actuator 58 is coupled to the lower member 12 at the rear end thereof by way of a bracket 60 and pivots about a laterally-oriented pivot axis thereof. A second end of the lifting actuator 58 is coupled to the upper member 16 at a front end thereof by way of a bracket 62 and pivots about a laterally-oriented pivot axis thereof. (Although not shown herein, the brackets 60, 62 can be bolted, screwed, or otherwise attached to the respective lower and upper members 12, 16.) As such, both ends of the lifting actuator 58 are able to pivot so that the lifting actuator 58 can extend between the lower and upper members 12, 16 even as the upper member 16 raises or tilts upwardly away from the lower member 12. In the present example, the brackets 60, 62 are fixed in the front-back direction 30, but in other examples, one or both of the brackets 60, 62 could be translatable to allow the extension of the lifting actuator 58 to be more vertically-directed as the upper member 16 rises upwardly away from the lower member 12.

Each of the actuators 50, 54, 58 is shown as an electric linear actuator with an associated motor 51, 55, 59, respectively. The motors 51, 55, 59 are connected to a power source, such as a battery, and to one or more switches and/or a controller, as will be described further herein below, which allow current to flow from the power source to the motors 51, 55, 59 to activate the motors 51, 55, 59. As is known, when activated, the motors 51, 55, 59 drive the respective inner tubes of the actuators 50, 54, 58 in or out of the respective outer tubes thereof, thereby moving whatever component is connected to the clevis on the end of the inner tube. In other examples, the actuators 50, 54, 58 could be electric rack-and-pinion-type actuators or hydraulic actuators. In another example, the actuators 50, 54 associated with the translating pivots could be motors attached to lead screws that run through holes in the brackets 47, 49.

As will now be discussed with respect to FIGS. 5-16, by way of pivoting and/or translation of at least one of (i.e., one or both of) the first and second linkages 34a, 40a with respect to at least one of (i.e., one or both of) the lower and upper members 12, 16 (i.e., along the respective first and/or second channel 28a, 32a), the upper member 16 is translatable in the front-back direction 30 with respect to the lower member 12, the upper member 16 is raiseable and lowerable with respect to the lower member 12, and the upper member 16 is tiltable at various angles with respect to the lower member 12. Such varied motion is achievable in part because the first and second channels 28a, 32a (and corresponding third and fourth channels 28b, 32b) are offset from one another in the front-back direction 30 and in part because the first and second linkages 34a, 40a (and corresponding third and fourth linkages 34b, 40b) are offset from one another in the front-back direction 30 (in other words, at least in this example, the first and second linkages 34a, 40a—and third and fourth linkages 34b, 40b—do not cross in a scissors-like fashion.) Although the left side view of the seat support assembly 10 is shown in these examples, and thus only movement of the first and second linkages 34a, 40a along the first and second channels 28a, 32a will be described, it should be understood that the third and fourth linkages 34b, 40b move in parallel with the first and second linkages 34a, 40a along the respective third and fourth channels 28b, 32b on the right side of the seat support assembly 10 due to the connections provided by the lower crosspiece 46 and upper crosspiece 48, respectively, or the simultaneous activation of separate actuators for each linkage as described herein above. Note that in other examples, the linkages 34a, 40a may be designed to support the upper member 16 on their own, without provision of linkages 34b, 40b. In such examples, the linkages 34a, 40a may be provided towards the lateral centerlines of the lower and upper members 12, 16 and/or may be dimensioned more robustly in the lateral direction of the seat support assembly 10.

Figure 5:
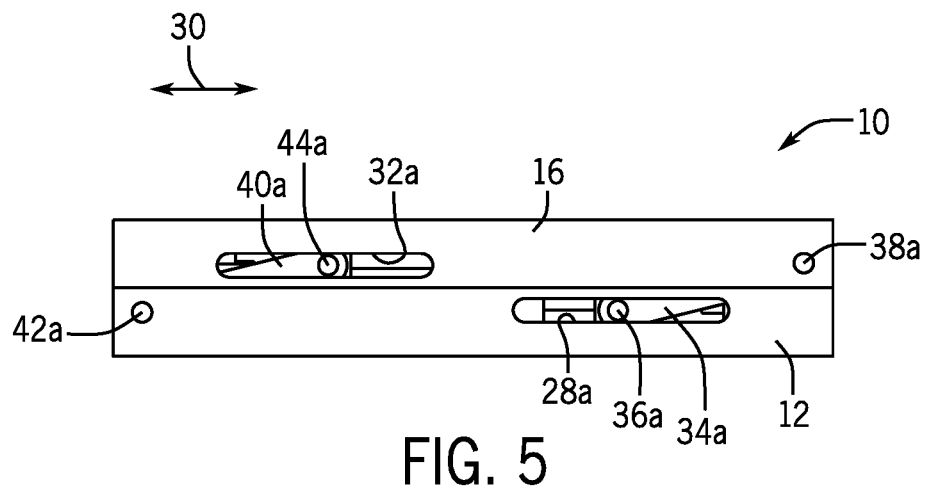
FIG. 5 illustrates a left side view of the seat support assembly in a centered position.
Figure 6:
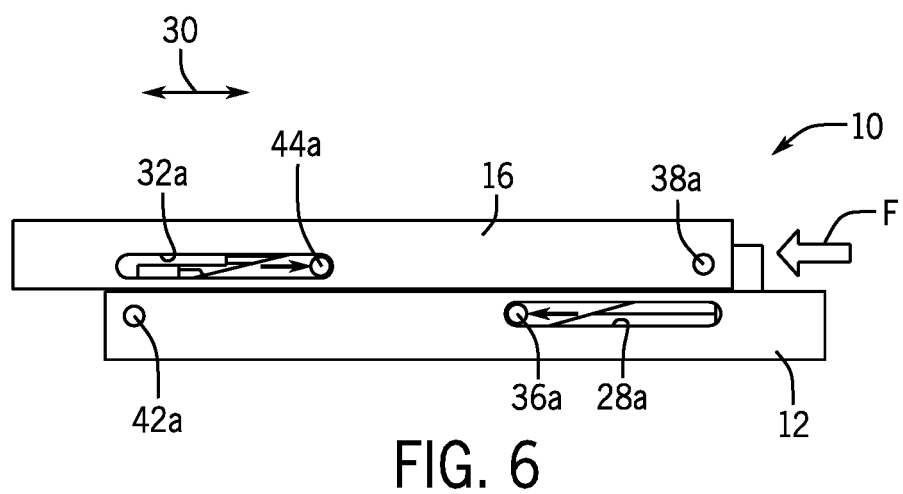
FIG. 6 illustrates a left side view of the seat support assembly in a slid-forward position.
Figure 7:
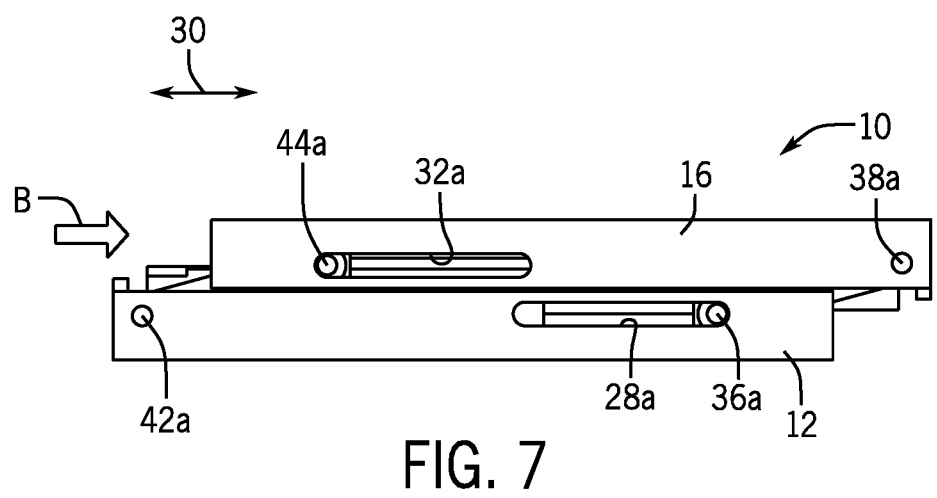
FIG. 7 illustrates a left side view of the seat support assembly in a slid-backward position.
Figure 8:
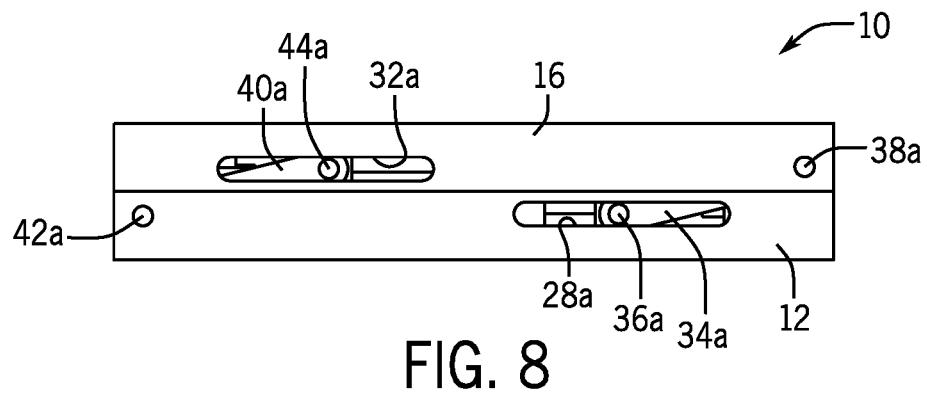
FIG. 8 illustrates a left side view of the seat support assembly in a fully lowered position.

FIGS. 5-7 show how the upper member 16 can be translated in the front-back direction 30 with respect to the lower member 12. In FIG. 5, the upper member 16 is centered above the lower member 12. The first linkage 34a is positioned such that its lower end is located about midway between the ends of the first channel 28a, as shown by location of pin 36a. When the upper member 16 is in this position, the lower actuator 50 may be in a partially extended position. Similarly, the upper end of the second linkage 40a is located about midway between the ends of the second channel 32a, as shown by location of pin 44a. When the upper member 16 is in this position, the upper actuator 54 may also be in a partially extended position.

To move the upper member 16 forward (with respect to the orientation of a seat coupled to the upper member 16), as shown in FIG. 6, the inner tube of the lower actuator 50 is retracted. This moves the pin 36a connected to lower end of the first linkage 34a as far to the front of the first channel 28a as possible, as shown by the arrow. At the same time, the inner tube of the upper actuator 54 is also retracted, which moves the pin 44a connected to the end of the second linkage 40a as far to the back of the second channel 32a as possible, as shown by the arrow. Such movement of the linkages 34a, 40a moves the upper member 16 forward, as shown by the arrow F. Also at the same time, the inner tube of the lifting actuator 58 is extended to prevent the upper member 16 from rising. Provided that the motors 51, 55 operate at the same speed and the motor 59 operates at a slightly slower speed, the actuators 50, 54, 58 can be actuated simultaneously and for the same length of time from the starting position shown in FIG. 5 in order to achieve this forward movement F without any tilting or upwards movement of the upper member 16 occurring at the same time. It should be understood that forward positions intermediate those shown in FIGS. 4 and 5 are possible by simultaneously retracting the lower and upper actuators 50, 54 for a shorter length of time.

In FIG. 7, the upper member 16 is moved backward, as shown by the arrow B. Such movement is achieved by extending the inner tube of the lower actuator 50 until the pin 36a connected to the lower end of the first linkage 34a reaches the back end of the first channel 28a, as shown by the arrow. Simultaneously, the inner tube of the upper actuator 54 is also extended until the pin 44a connected to the upper end of the second linkage 40a reaches the front end of the second channel 32a. The inner tube of the lifting actuator 58 is at the same time retracted to prevent the upper member 16 from rising. It should be understood that positions intermediate those shown in FIGS. 5 and 7 are possible by simultaneously extending the lower and upper actuators 50, 54 for a shorter length of time.

Thus, by way of the lower actuator 50 coupled between the lower member 12 and the first linkage 34a, the lower actuator 50 being configured to translate the first linkage 34a in the front-back direction 30 along the first channel 28a, and by way of the upper actuator 54 coupled between the upper member 16 and the second linkage 40a, the upper actuator 54 configured to translate the second linkage 40a in the front-back direction 30 along the second channel 32a, the upper member 16 is able to move in a front-back direction 30 with respect to the lower member 12, as shown in FIGS. 6 and 7.

FIG. 8 again shows the upper member 16 in a centered, non-raised position with respect to the lower member 12. This is achieved the same way as described with respect to FIG. 5, and therefore will not be discussed further herein. However, FIG. 8 is provided again for adjacent comparison with FIGS. 9 and 10.

Figure 9:
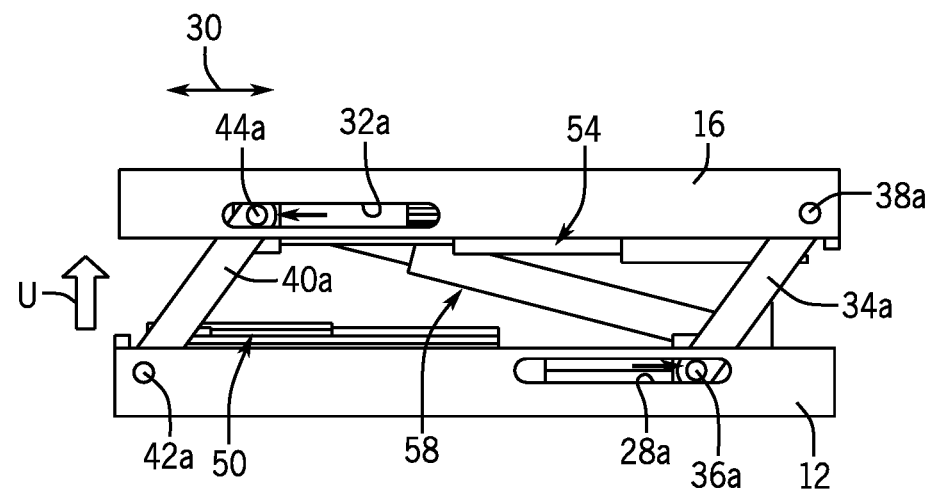
FIG. 9 illustrates a left side view of the seat support assembly in a raised position.

In FIG. 9, the upper member 16 is raised with respect to the lower member 12, but still centered in the front-back direction 30 with respect thereto. This is achieved by simultaneously extending the inner tubes of both the lower and upper actuators 50, 54, as shown by the arrows, while also extending the inner tube of the lifting actuator 58, which causes the upper member 16 to move in the direction of arrow U. The speed of the motor 59 on the lifting actuator 58 can be selected such that the upper member 16 rises vertically without also tilting or moving in the front-back direction 30. Thus, the upper member 16 is configured to be raised and lowered with respect to the lower member 12 without necessarily also translating in the front-back direction 30 with respect to the lower member 12. Alternatively, the upper member 16 can first be moved backward with respect to the lower member 12 (compare the positions of pivot pins 36a, 44a in FIGS. 7 and 9) and then the lifting actuator 58 can be extended to pivot the upper member 16 upwardly. It should be understood that intermediate raised positions are possible by extending the inner tubes of the actuators 50, 54, 58 to lesser extents than those shown in FIG. 9.

Figure 10:
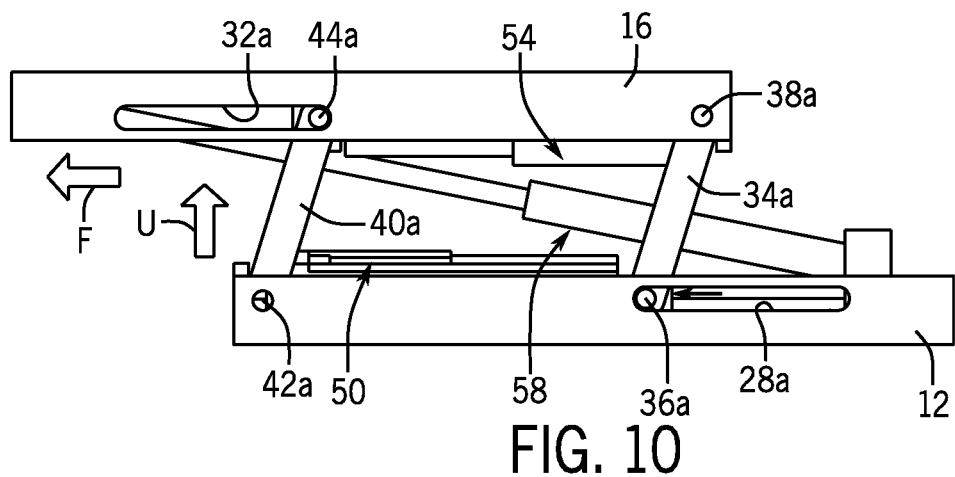
FIG. 10 illustrates a left side view of the seat support assembly in a raised and slid-forward position.
Figure 11:
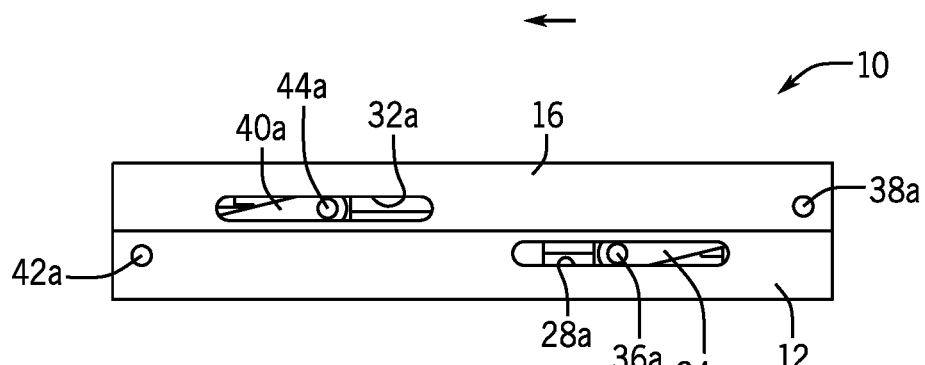
FIG. 11 illustrates a left side view of the seat support assembly in a non-tilted position.

FIG. 10 shows the upper member 16 raised and moved forward with respect to the lower member 12. This can be done after the upper member 16 has been raised to the position shown in FIG. 9 as described with respect thereto, by retracting the inner tube of the lower actuator 50 and the inner tube of the upper actuator 54 at the same time, as shown by the arrows, until the pin 36a connected to the lower end of the first linkage 34a is at the front end of the first channel 28a and the pin 44a connected to the upper end of the second linkage 40a is at the back end of the second channel 32a. Alternatively, the position of FIG. 10 could be achieved directly from the starting position of FIG. 8 by retracting the inner tube of the lower actuator 50 and the inner tube of the upper actuator 54 to move the upper member 16 in the direction of arrow F, while at the same time extending the inner tube of the lifting actuator 58 to move the upper member in the direction of the arrow U. Again, the motor speeds could be chosen to achieve a smooth transition from the position of the upper member 16 shown in FIG. 8 to the position of the upper member shown in FIG. 10. Further, those of ordinary skill in the art would understand that intermediate raised and forward positions are possible by activating the motors 51, 55, 59 of the actuators 50, 54, 58 for shorter lengths of time.

FIG. 11 again shows the upper member 16 in a centered, non-raised, non-tilted position with respect to the lower member 12. This is achieved the same way as described with respect to FIG. 5, and therefore will not be discussed further herein. However, FIG. 11 is provided again for adjacent comparison with FIGS. 12 and 13.

Figure 12:
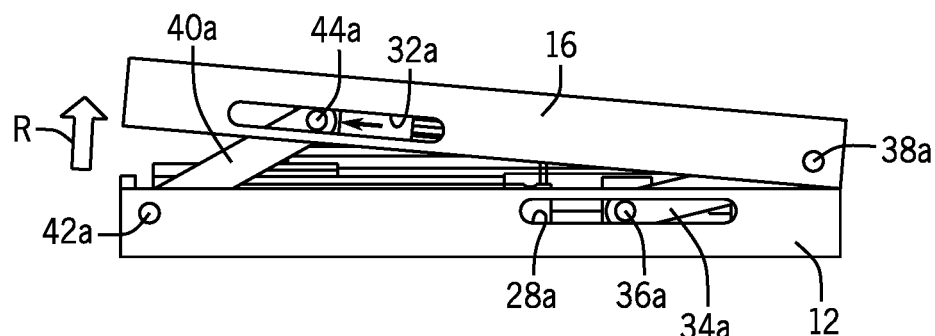
FIG. 12 illustrates a left side view of the seat support assembly in a reclined position.

FIG. 12 shows the upper member 16 in a tilted/reclined position with respect to the lower member 12. This is achieved by not actuating the lower actuator 50 from the position of FIG. 11, but extending the inner tube of the upper actuator 54 in the direction of the arrow, as shown by the pin 44a connected to the upper end of the second linkage 40a being moved further toward the front end of the second channel 32a than in FIG. 11. The inner tube of the lifting actuator 58 is simultaneously extended to lift the front end of the upper member 16 off the lower member 12, and the upper member 16 is thus reclined in the direction of arrow R. It should be understood that the upper member 16 can be reclined more or less than shown herein by more or less extension of the inner tubes of the actuators 54, 58.

Figure 13:
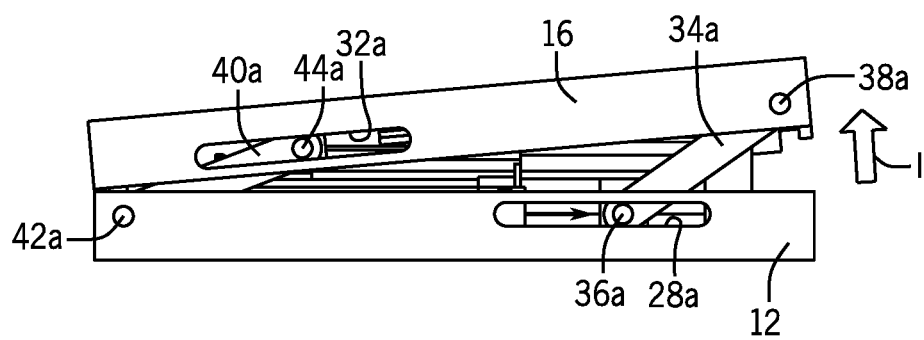
FIG. 13 illustrates a left side view of the seat support assembly in an inclined position.

FIG. 13, in contrast, shows the upper member 16 in a tilted/inclined position with respect to the lower member 12. This is achieved by extending the inner tube of the lower actuator 50 in the direction of the arrow, as shown by the pin 36a connected to the lower end of the first linkage 34a being more toward the back end of the first channel 28a than in FIG. 11, but not activating the upper actuator 54 from the position shown in FIG. 11. Because the front end of the upper member 16, to which the lifting actuator 58 is coupled, does not move much, it may not be necessary to activate the lifting actuator 58, as pivoting thereof about the pivot axes of brackets 60, 62 may provide enough movement to accommodate the incline movement (arrow I) of the back end of the upper member 16. In other examples, the lifting actuator 58 may be actuated slightly to accommodate any increased dimension between the front end of the upper member 16 and the back end of the lower member 12 that results from the inclined movement. It should be understood that the upper member 16 can be inclined more or less than shown herein by more or less extension of the inner tube of the actuator 50.

Figure 14:
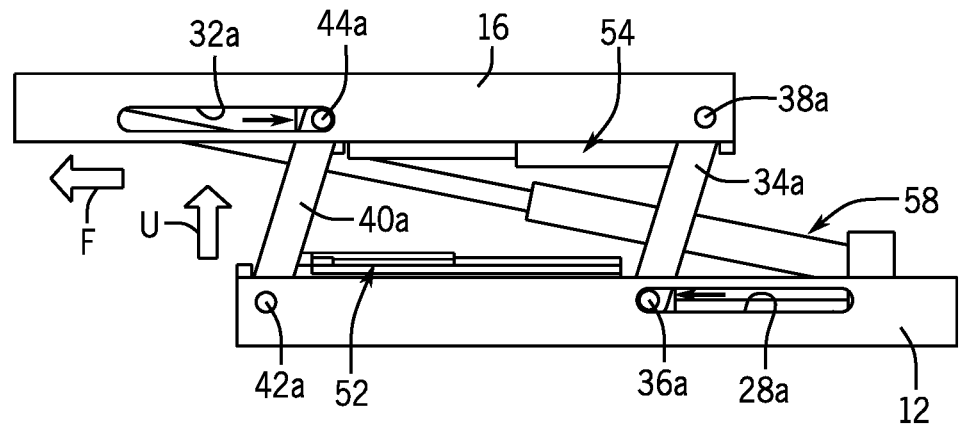
FIG. 14 illustrates a left side view of the seat support assembly in the raised and slid-forward position, similar to FIG. 8.

FIG. 14 shows the upper member 16 in a raised and forward position with respect to the lower member 12, which can be achieved as described herein above with respect to FIG. 10. However, FIG. 14 is provided again for adjacent comparison with FIGS. 15 and 16.

Figure 15:
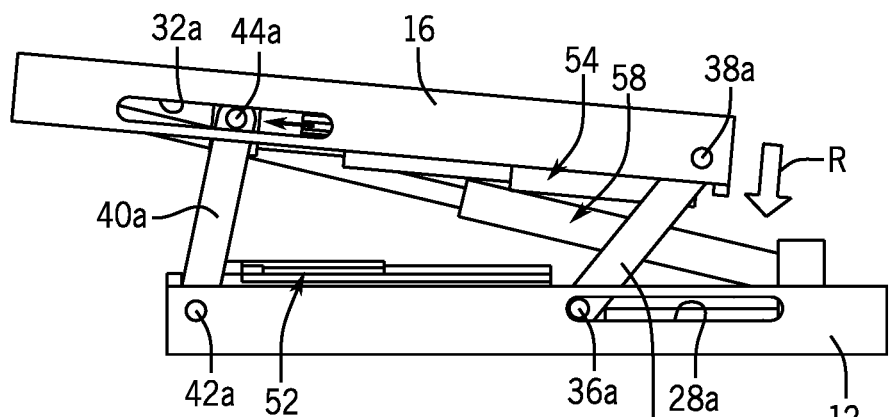
FIG. 15 illustrates a left side view of the seat support assembly in a raised, slid-forward, and reclined position.

FIG. 15 shows the upper member 16 in a raised, forward, and reclined position with respect to the lower member 12. Such a position can be achieved from the position shown in FIG. 14 by extending the inner tube of the upper actuator 54 as shown by the arrow, as can be seen by the upper pin 44a moving forward within the second channel 32a with respect to the position shown in FIG. 14. The lower actuator 50 is not actuated. Simultaneously, the inner tube of the lifting actuator 58 may be extended slightly to accommodate the increased dimension between the front end of the upper member 16 and the back end of the lower member 12. The upper member 16 thus reclines as shown by arrow R.

Alternatively, starting from the position shown in FIG. 14, the inner tube of the lower actuator 50 can be extended to move the lower end of the first linkage 34a backward, as shown by the arrow and by the pin 36a being further toward the back end of the first channel 28a than in FIG. 14. The upper actuator 54 is not actuated, but the inner tube of the lifting actuator 58 may be simultaneously retracted slightly to account for the decreased dimension between the front end of the upper member 16 and the back end of the lower member 12. The upper member 16 therefore inclines in the direction of arrow I.

Thus, by way of a lower end of the first linkage 34a being pivotably and translatably coupled to the lower member 12, and an upper end of the second linkage 40a being pivotably and translatably coupled to the upper member 16, the upper member 16 is able not only to translate in the front-back direction 30 as shown in FIGS. 6 and 7, but also to be raised and lowered and tilted (or combinations of the above) with respect to the lower member 12, as shown in FIGS. 9, 10, and 12-16.

The seat support assembly 10 is thus a low-profile seat riser and slide system that additionally allows the seat to incline and recline. By way of a four-bar linkage assembly (comprised of the lower member 12, upper member 16, and first and second linkages 34a, 40a), the seat support assembly 10 allows for the upper member 16 to rise with respect to the lower member 12, while the translating pivots (at pins 36a, 44a) move to counteract the forward or backward movement that would otherwise inherently result from such a four-bar linkage. The translating pivots also allow the upper member 16 to slide forward and backward with respect to the lower member 12, without the upward or downward motion that would otherwise be inherent in a four-bar linkage with four fixed pivot points. By way of pivot translation and raising the upper member 16 away from the lower member 12, tilted positions are also possible. This is in contrast to known four-bar linkages for seat support assemblies, which have fixed pivots and can raise and lower the seat in an arced fashion, but require a separate mechanism to slide the seat forward and backward and do not allow for tilt. This is also in contrast to scissors-style seat support assemblies, some of which have translating pivots at adjacent ends of the upper and lower members to allow for vertical rise, but which do not allow for slide or tilt.

Note that the locations and extents of the channels 28a, 28b and 32a, 32b are for exemplary purposes only. In another example, pivotable and translatable couplings are provided between the first and third linkages 34a, 34b and the upper member 16 (instead of the lower member 12, as shown), along with pivotable and translatable couplings provided between the second and fourth linkages 40a, 40b and the lower member 12 (instead of the upper member 16, as shown). In another example, all of the couplings between the linkages and the lower and upper members are both pivotable and translatable. Furthermore, the extent of the channels can vary, and it is contemplated that the first linkage 34a is translatable in the front-back direction 30 along a portion of the lower member 12, and the second linkage 40a is translatable in the front-back direction 30 along a portion of the upper member 16. The portions of the lower and upper members 12, 16 along which the linkages 34a, 40a are translatable can be offset from one another in the front-back direction 30 (i.e., one at the front end of the seat supporting assembly 10 and one at the back end thereof) in order to allow for the movement of the linkages 34a, 40a as described herein above to achieve the positions of the upper member 16 shown in FIGS. 5-16. In the present example, the portion of the lower member 12 is a channel 28a formed in the lower member 12, and the portion of the upper member 16 is a channel 32a formed in the upper member 16. However, in other examples, the translatable ends of the linkages may be provided with rollers, bearings, casters, or other slidable or rollable devices that allow them to move with respect to the lower and upper members 12, 16.

In some examples, a shock absorbing assembly is coupled between at least one of (i.e., one or both of) the lower member 12 and the first linkage 34a and the upper member 16 and the second linkage 40a. For example, the shock absorber could be an air spring located side-by side with the upper and/or lower actuator 50, 54, or the upper and/or lower actuator 50, 54 could be provided with a spring thereabout to form a coilover shock absorber. In another example, if the actuators are hydraulic, they could be filled with a magnetorheological fluid that changes viscosity upon application of an electromagnetic field that varies based on sensed ride conditions.

The positions of the seat support assembly 10 in FIGS. 5-16 can be commanded by the operator using one or more input devices, such as switches, buttons, a keypad, or a touchscreen on the marine vessel or on the passenger's handheld device. If a single user input device is provided (such as a touchscreen), it can be connected to the controller 114 via the I/O interface 120 or the bus interface 122, and the controller 114 can be connected to each of the motors 51, 55, 59 of the actuators 50, 54, 58 (see, more generally, actuator 112) via the I/O interface 120. On the other hand, if separate user input devices are provided for each movement (e.g., forward and backward switches, raise and lower switches, recline and incline switches, rotate clockwise and counter-clockwise switches), the switches can be hardwired directly to the appropriate motors 51, 55, 59 of the actuators

50, 54, 58. In yet another example, separate switches for each movement may all be electrically connected to the controller 114 via the I/O interface 120, and the controller 114 interprets the inputs from the switches and provides outputs to the actuator 112 accordingly. Returning to FIG. 1, one example of such an input device 126 is shown as being on the side of the seat 106, which input device 126 can be a keypad or a plurality of switches.

In one example, the input device 126 is in signal communication with the controller 114, and the controller 114 is configured to store a current position of the seat 106 with respect to the base 104 as a predetermined position in response to operator input to the input device 126. For example, the operator can move the seat 106 to a preferred height using a raise/lower button or switch, can move the seat to a preferred forward or backward position using a forward/back button or switch, can tilt the seat to a preferred inclined or reclined position using an incline/recline button or switch, and can swivel the seat to a preferred angle using a clockwise/counter-clockwise rotation button or switch. The operator can thereafter can command the controller 114 to store the preferred position of the seat 106 for later retrieval in response to operator input or in response to the controller 114 carrying out the algorithm stored in the seat adjustment module 124. To facilitate storage of the preferred position, the seating system 100 may include a sensor 129 configured to provide to the controller 114 a current position of the seat 106 with respect to the base 104. The position sensor 129 can be a Hall effect-based sensor, a potentiometer, or other known type of position sensor and can be installed on the seat support assembly 10, such as on the lower or upper members 12, 16; the linkages 34a, 34b and/or 40a, 40b; and/or on the actuators 50, 54, 58, such as to measure the position of the inner tube with respect to the outer tube thereof. Those having ordinary skill in the art would understand that a sensor such as a rotary encoder located in the swivel assembly 110 could measure the rotational position of the seat 106 with respect to the base 104.

To store the measured position of the seat 106 in the forward-backward direction, up-down direction, incline-recline direction, and/or rotational direction, the operator could select a separate button or key on the input device 126. Alternatively, the operator may select a "store" option via a helm interface or via an application interface on a smart device. In response, the controller 114 stores the measured position of the seat 106 (including in each of the forward-backward direction, up-down direction, incline-recline direction, and rotational direction) as a predetermined position in the storage system 118, which predetermined position can later be retrieved while executing the instructions of the seat adjustment module 124.

Other predetermined positions of the seat 106 with respect to the base 104 stored in the storage system 118 may be stored by the seat manufacturer or the person commissioning the marine vessel.

Current powered marine seating does not give true positional feedback or provide automated control. There is no automated actuation based on vessel state or an operator's preference. Currently, all power actuation must be controlled from the helm by individual controls (e.g., buttons) for each type of seat movement (e.g. raise/lower or forward/back slide), with individual wires running from the buttons in the helm to actuators in the seat. Positions of the actuators are not recorded, and thus the seat cannot return to a previous desired position. The only known position of the seat is when the actuator reaches its end limits. Moreover, there is no controller within the seat assembly controlling such actuation. Thus, the present inventors have discovered through research and development that a controller located on, in, or near the seat can automate seat positioning with respect to marine vessel operating conditions and/or operator preferences. Examples of such automated positioning are described herein below.

In one example, in response to the presence of the operator on the marine vessel and in response to the power unit being in a stopped state, the controller 114 may activate the actuator 112 to translate the seat 106 backward with respect to the base 104, thereby moving the seat 106 away from the helm console and allowing the operator easy access to the seat 106. In one example, the controller 114 moves the seat to a predetermined position shown in FIG. 7 by activating the actuators as described herein above. The presence of the operator can be determined by the transceiver 127, weight sensor, or signal from an operator input device as noted herein above. The power unit being in a stopped state can be determined by one or more of the power unit sensors 128 as noted herein above, such as by an engine or motor speed sensor sensing zero RPM or a start/stop button at the helm not being depressed. In other examples, the seat adjustment module 124 may be programmed to move the seat 106 backward in response to additional indications that the operator wishes to drive the marine vessel after a period of inactivity, such as a key not being in the ignition and/or the marine vessel having remained in the same geographical position for more than a predetermined period of time. Once the operator is in the seat, as determined by a weight sensor or by operator input, the seat 106 may be moved to the predetermined position of FIG. 5 or FIG. 6 by activating the actuators as described herein above. Whether the seat moves to the predetermined position of FIG. 5 or FIG. 6 or somewhere therebetween may depend on the operator's saved preference.

By way of another example, in response to the power unit being started from a stopped state, the controller 114 may activate the actuator 112 to raise the seat 106 with respect to the base 104. In one example, the controller 114 moves the seat to the predetermined position shown in FIG. 9 by activating the actuators as described herein above. The controller 114 may determine that the power unit is started from one or more power unit sensor(s) 128, such as in response to a start/stop button being pressed at the helm and/or an engine or motor speed sensor determining that the engine or motor is operating above a threshold speed after recently having been at zero RPM. Raising the seat 106 with respect to the base 104 allows the operator to see over the dash better, as might be required if the operator is maneuvering out of a marina or dock area. In response to the power unit being started from a stopped state, the controller 114 may alternatively be configured to move the seat 106 to the predetermined raised and inclined position shown in FIG. 16, by activating the actuators as described herein above, to raise the operator's torso for a better view while allowing the operator's feet to remain on the deck.

Figure 16:
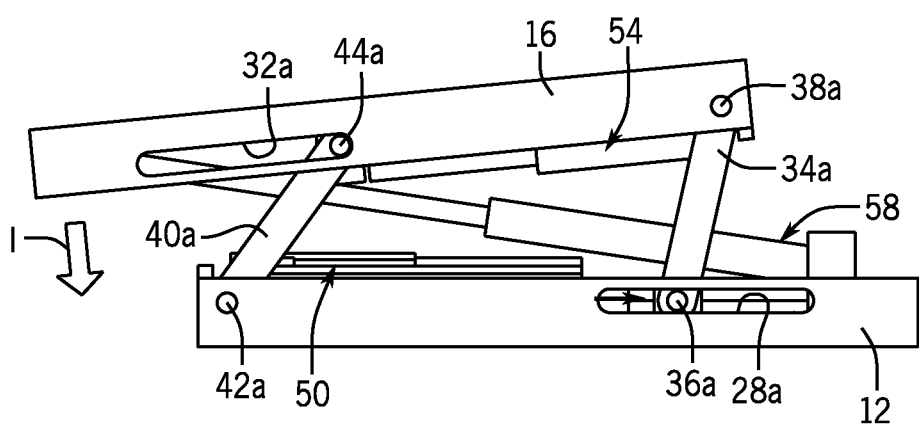
FIG. 16 illustrates a left side view of the seat support assembly in a raised, slid-forward, and inclined position.

Furthermore, in response to the pitch of the marine vessel being greater than or equal to a predetermined pitch, the controller 114 may activate the actuator 112 to raise the seat 106 with respect to the base 104 to the predetermined position shown in FIG. 9 or to raise the seat 106 with respect to the base 104 and to tilt the seat 106 forward with respect to the base 104 to the predetermined position shown in FIG. 16. The predetermined pitch of the marine vessel at or above which the controller 114 may command such seat adjustment may be a pitch corresponding to bow rise of the marine vessel, in which instance it may be hard for the operator to see over the dash. The controller 114 may also require that the operator is moving a control lever (e.g., throttle lever) to command increased thrust and/or that the engine or motor speed is greater than a predetermined speed, as determined by the power unit sensor(s) 128, before moving the seat 106 to the position of FIG. 9 or 16, which conditions may further indicate that the marine vessel is accelerating in an attempt to get on plane, versus simply pitching due to external influences such as waves. Additionally or alternatively, the seat adjustment module 124 may be programmed to require that the pitch of the marine vessel be greater than the predetermined pitch for longer than a predetermined time period, such as 3-5 seconds, for the same reason of further indicating that the marine vessel is accelerating in an attempt to get on plane.

In another example, in response to the speed of the marine vessel being greater than or equal to a predetermined threshold speed, the controller 114 may activate the actuator 112 to move the seat 106 toward a centered position with respect to the base 104 and to lower the seat 106 with respect to the base 104. In one example, the controller 114 moves the seat 106 to the position shown in FIG. 5 by activating the actuators as described herein above. The controller 114 may determine that the vessel speed is greater than the threshold speed by measurements from the speed sensor 130 and/or GPS 132. In one example, the predetermined threshold speed is a calibrated cruising speed of the marine vessel. In some examples, the controller 114 may also require that the pitch sensor 134 first senses a pitch greater than the predetermined pitch, and then senses a pitch less than the predetermined pitch, indicating that the marine vessel has accelerated (with the attendant bow rise) to get on plane and is now cruising on-plane at a lesser pitch, before actuating the seat 106 to the noted position. When the marine vessel is cruising, the operator presumably does not need to be perched up high to see over the dash, and therefore the predetermined position of the seat 106 is the centered, lowered position. Of course, the operator may program any desired position for cruising (centered and slightly raised, lowered and slightly forward, etc.) by way of the input device 126 or via the helm interface and may overwrite the calibrated cruising position of the seat 106.

In some examples, the seat adjustment module 124 could be programmed to move the seat 106 to the position of FIG. 7, then FIG. 9 or 16, and then FIG. 5 as the operator boards the marine vessel, then starts the power unit and maneuvers away from a dock, then accelerates to get on-plane, then achieves cruising speed. In other words, the controller 114 may not actuate the seat 106 to one of the subsequent positions until the seat 106 has already been actuated to the prior position(s) in response to the noted conditions.

In yet another example, in response to the geographical location of the marine vessel remaining substantially the same for greater than a predetermined time period, the controller 114 may activate the actuator 112 to tilt the seat 106 backward with respect to the base 104. For example, the controller 114 may move the seat 106 to the predetermined position shown in FIG. 12 by activating the actuators as described herein above. The geographical position of the marine vessel can be determined by the GPS 132 as noted herein above. The geographical position remaining substantially the same for greater than a predetermined time period (for example, 1-2 minutes) may indicate that the marine vessel is being operated in a station-keeping mode or has dropped anchor, during which time the operator may wish to sit back and relax. Thus, by remaining "substantially the same," those having ordinary skill in the art would understand that this encompasses a marine vessel that remains stationary or moves within a small radius (e.g., 10 feet) around an anchor or a geographical setpoint. Additionally or alternatively, the controller 114 may actuate the seat 106 to the reclined position in response to a determination that the station-keeping mode has been activated at the helm, which may be information conveyed from the main controller 136. In some examples, the reclined position of FIG. 12 could be automatically commanded when the engine/motor is off, as determined by the power unit sensor(s) 128, but the weight of a passenger is still sensed in the seat 106 and/or a key remains in the ignition for longer than a predetermined period of time after the engine/motor is stopped. These conditions might also indicate that the operator has dropped an anchor.

In some examples, the controller 114 may additionally be programmed to rotate the seat 106 by way of the swivel assembly 110 toward a center of the marine vessel in response to the geographical location of the marine vessel remaining substantially the same for greater than a predetermined time period and/or when the engine/motor is off, but the weight of a passenger is still sensed in the seat 106 and/or a key remains in the ignition for longer than a predetermined period of time after the engine/motor is stopped. This could rotate the operator in the seat 106 to a "social/conversation" position with respect to the passengers.

In some examples, the raised and inclined predetermined position of FIG. 16 might be automatically commanded when the marine vessel is docking. The controller 114 may be programmed to assume that the marine vessel is docking when the GPS position, as determined by the GPS 132, is near a geographical location of a known dock or marina. The controller 114 may additionally or alternatively require that the boat speed is below a predetermined threshold speed and/or that a joystick is being operated before assuming that the marine vessel is docking and controlling the seat to the predetermined position of FIG. 16.

In some examples, the backward position of FIG. 7 may be automatically commanded when the engine/motor is stopped after having been on. This may provide increased room for the operator to exit the helm area.

Note that although the above description has described the seat 106 as being moved to the exemplary position shown in a particular figure, this movement of the seat 106 occurs as a result of movement of the upper member 16 with respect to the lower member 12 and the connection of the seat 106 to the upper member 16. Many of the exemplary positions of the upper member 16 are shown as being at the limits of positioning in the forward-back, up-down, or tilt directions. It should be understood that the predetermined positions may instead be positions intermediate the centered, lowered position of FIG. 5 and the exemplary predetermined positions shown herein. Furthermore, the seat support assembly 10 is not the only seat support assembly that can provide forward-backward, up-down, or tilting movement. Other known seat support assemblies could be provided with a controller 114 and commanded to move a seat to positions identical or similar to those described herein. In other examples, the up-down movement could be provided by a mechanism located in a telescoping pedestal 108, as is traditional, while the forward-back movement could be provided by a slide mechanism below the seat 106, as is also traditional. Furthermore, although the exemplary seat support assembly 10 described herein has forward-back, up-down, and tilt movement provided by electric actuators, and electrically-actuated pivoting via the swivel assembly 110, in other examples, some of the seat's movements can be manually actuated instead of electrically actuated. Moreover, it would be understood that not all of the seat's movements described herein above need be available for a given seating system 100, in which case the controller 114 would control those movements that were available and electrically actuated.

Additionally, although many descriptions herein above are provided with respect to the operator's seat at the helm, it should be understood that passenger seats on the marine vessel could be provided with controllers and automatically moved to some of the positions described herein above in response to the conditions noted herein above. Each passenger seat could have its own controller on or in the seat assembly 102 or provided below the deck. Alternatively, the main controller 136 or a separate master seat controller could be provided in communication with the actuators in each seat. In some examples, one seat assembly (such as the operator's seat assembly) has a master controller associated therewith, which master controller controls slave controllers associated with other seats on the marine vessel. The seats' controllers could be connected by way of a local interconnect network (LIN) bus, and a gateway could connect the LIN bus to the main network bus 125 on the marine vessel. In an alternative embodiment, the seats' controllers could be connected by way of the CAN bus and could communicate using the NMEA 2K protocol.

The present disclosure also contemplates a method in which an operator stores the predetermined positions for maneuvering while docking or leaving a dock, while accelerating, while cruising, and/or while station-keeping/anchoring. For example, the controller 114 could be configured to direct the operator through a configuration mode, in which the operator uses the input device 126 to move the seat 106 to a preferred position for each operating mode and then stores that preferred position in conjunction with that operating mode. Such a configuration mode can be run while the vessel is stationary or while the vessel is operating in the mode in question. The controller 114 can also be configured to allow the operator to override any predetermined position of the seat 106 temporarily by manipulating the input device 126. The controller 114 can be configured to allow the operator to store-over the predetermined positions at any time by pressing a given button or selecting a given option while the seat is in a new preferred position. Furthermore, as noted briefly herein above, the controller 114 can be configured to store different predetermined positions for different operators. The operators can be automatically identified by way of a unique code received by the transceiver 127 from the operator's transmitter or transceiver, or the operators can identify themselves via the input device 126, an input device at the helm, and/or an application on a smart device.

In the present description, certain terms have been used for brevity, clarity, and understanding. No unnecessary limitations are to be implied therefrom beyond the requirement of the prior art because such terms are used for descriptive purposes only and are intended to be broadly construed. The different components and assemblies described herein may be used or sold separately or in combination with other components and assemblies. Various equivalents, alternatives, and modifications are possible within the scope of the appended claims.

What is claimed is:

1. A seating system for a marine vessel, the seating system comprising:
    a seat assembly including:
        a base configured to be connected to a deck of the marine vessel;
        a seat configured to be supported by the base; and
        an actuator configured to adjust a position of the seat with respect to the base; and
    a controller configured to control the actuator;
    wherein the controller is configured to activate the actuator to adjust the position of the seat with respect to the base to a predetermined position stored in the controller dependent on the following:
        a presence of an operator on the marine vessel;
        a state of a power unit of a marine propulsion device on the marine vessel;
        a speed of the marine vessel;
        a geographical location of the marine vessel; and/or
        a pitch of the marine vessel; and
    wherein in response to the presence of the operator on the marine vessel and in response to the power unit being in a stopped state, the controller activates the actuator to translate the seat backward with respect to the base.

2. The seating system of claim 1, wherein in response to the geographical location of the marine vessel remaining substantially the same for greater than a predetermined time period, the controller activates the actuator to tilt the seat backward with respect to the base.

3. A seating system for a marine vessel, the seating system comprising:
    a seat assembly including:
        a base configured to be connected to a deck of the marine vessel;
        a seat configured to be supported by the base; and
        an actuator configured to adjust a position of the seat with respect to the base; and
    a controller configured to control the actuator;
    wherein the controller is configured to activate the actuator to adjust the position of the seat with respect to the base to a predetermined position stored in the controller dependent on the following:
        a presence of an operator on the marine vessel;
        a state of a power unit of a marine propulsion device on the marine vessel;
        a speed of the marine vessel;
        a geographical location of the marine vessel; and/or
        a pitch of the marine vessel; and
    wherein in response to the power unit being started from a stopped state, the controller activates the actuator to raise the seat with respect to the base.

4. A seating system for a marine vessel, the seating system comprising:
    a seat assembly including:
        a base configured to be connected to a deck of the marine vessel;
        a seat configured to be supported by the base; and
        an actuator configured to adjust a position of the seat with respect to the base; and
    a controller configured to control the actuator;
    wherein the controller is configured to activate the actuator to adjust the position of the seat with respect to the base to a predetermined position stored in the controller dependent on the following:
        a presence of an operator on the marine vessel;
        a state of a power unit of a marine propulsion device on the marine vessel;
        a speed of the marine vessel;
        a geographical location of the marine vessel; and/or
        a pitch of the marine vessel; and wherein in response to the pitch of the marine vessel being greater than or equal to a predetermined pitch, the controller activates the actuator to raise the seat with respect to the base.

5. The seating system of claim 4, wherein the actuator is configured to translate the seat in a front-back direction with respect to the base, to raise and lower the seat with respect to the base, to tilt the seat at various angles with respect to the base, and/or to rotate the seat with respect to the base.

6. The seating system of claim 4, further comprising an input device in signal communication with the controller, wherein the controller is configured to store a current position of the seat with respect to the base as the predetermined position in response to operator input to the input device.

7. The seating system of claim 4, further comprising a sensor configured to provide to the controller a current position of the seat with respect to the base.

8. The seating system of claim 4, wherein the controller is located on or in the seat assembly and is connected to a main network of the marine vessel.

9. A seating system for a marine vessel, the seating system comprising:
a seat assembly including:
a base configured to be connected to a deck of the marine vessel;
a seat configured to be supported by the base; and
an actuator configured to adjust a position of the seat with respect to the base; and
a controller configured to control the actuator;
wherein the controller is configured to activate the actuator to adjust the position of the seat with respect to the base to a predetermined position stored in the controller dependent on the following:
a presence of an operator on the marine vessel;
a state of a power unit of a marine propulsion device on the marine vessel;
a speed of the marine vessel;
a geographical location of the marine vessel; and/or
a pitch of the marine vessel; and
wherein in response to the speed of the marine vessel being greater than or equal to a predetermined threshold speed, the controller activates the actuator to move the seat toward a centered position with respect to the base and to lower the seat with respect to the base.

10. A seat assembly for a marine vessel, the seat assembly comprising:
a base configured to be connected to a deck of the marine vessel;
a seat configured to be supported by the base;
an actuator configured to adjust a position of the seat with respect to the base in at least one of the following ways:
to translate the seat in a front-back direction with respect to the base;
to raise and lower the seat with respect to the base;
to tilt the seat at various angles with respect to the base; and
to rotate the seat with respect to the base; and
a controller in signal communication with the actuator, wherein the controller is configured to activate the actuator to adjust the position of the seat with respect to the base to a predetermined position stored in the controller;
wherein in response to a presence of an operator on the marine vessel and in response to a power unit of a marine propulsion device on the marine vessel being in a stopped state, the controller activates the actuator to translate the seat backward with respect to the base.

11. The seat assembly of claim 10, wherein in response to a geographical location of the marine vessel remaining substantially the same for greater than a predetermined time period, the controller activates the actuator to tilt the seat backward with respect to the base.

12. A seat assembly for a marine vessel, the seat assembly comprising:
a base configured to be connected to a deck of the marine vessel;
a seat configured to be supported by the base;
an actuator configured to adjust a position of the seat with respect to the base in at least one of the following ways:
to translate the seat in a front-back direction with respect to the base;
to raise and lower the seat with respect to the base;
to tilt the seat at various angles with respect to the base; and
to rotate the seat with respect to the base; and
a controller in signal communication with the actuator, wherein the controller is configured to activate the actuator to adjust the position of the seat with respect to the base to a predetermined position stored in the controller;
wherein in response to a power unit of a marine propulsion device on the marine vessel being started from a stopped state, the controller activates the actuator to raise the seat with respect to the base.

13. A seat assembly for a marine vessel, the seat assembly comprising:
a base configured to be connected to a deck of the marine vessel;
a seat configured to be supported by the base;
an actuator configured to adjust a position of the seat with respect to the base in at least one of the following ways:
to translate the seat in a front-back direction with respect to the base;
to raise and lower the seat with respect to the base;
to tilt the seat at various angles with respect to the base; and
to rotate the seat with respect to the base; and
a controller in signal communication with the actuator, wherein the controller is configured to activate the actuator to adjust the position of the seat with respect to the base to a predetermined position stored in the controller;
wherein in response to a pitch of the marine vessel being greater than or equal to a predetermined pitch, the controller activates the actuator to raise the seat with respect to the base.

14. A seat assembly for a marine vessel, the seat assembly comprising:
a base configured to be connected to a deck of the marine vessel;
a seat configured to be supported by the base;
an actuator configured to adjust a position of the seat with respect to the base in at least one of the following ways:
to translate the seat in a front-back direction with respect to the base;
to raise and lower the seat with respect to the base;
to tilt the seat at various angles with respect to the base; and
to rotate the seat with respect to the base; and
a controller in signal communication with the actuator, wherein the controller is configured to activate the actuator to adjust the position of the seat with respect to the base to a predetermined position stored in the controller;

wherein in response to a speed of the marine vessel being greater than or equal to a predetermined threshold speed, the controller activates the actuator to move the seat toward a centered position with respect to the base and to lower the seat with respect to the base.

15. The seat assembly of claim 14, wherein the controller is configured to activate the actuator to adjust the position of the seat with respect to the base to the predetermined position dependent on the following:
- a presence of an operator on the marine vessel;
- a state of a power unit of a marine propulsion device on the marine vessel;
- the speed of the marine vessel;
- a geographical location of the marine vessel; and/or
- a pitch of the marine vessel.

16. The seat assembly of claim 15, wherein the controller is in signal communication with a main network of the marine vessel, by way of which the controller is provided with information related to the presence of the operator, the state of the power unit, the speed of the marine vessel, the geographical location of the marine vessel, and/or the pitch of the marine vessel.

17. The seat assembly of claim 14, further comprising an input device in signal communication with the controller, wherein the controller is configured to store a current position of the seat with respect to the base as the predetermined position in response to operator input to the input device.

18. The seat assembly of claim 14, further comprising a sensor configured to provide to the controller a current position of the seat with respect to the base.

* * * * *